Dec. 22, 1970   G. SPROGIS   3,549,983
HIGH EFFICIENCY HIGH POWER D.C. SERIES TYPE VOLTAGE REGULATOR
Filed June 18, 1968

INVENTOR
GUNARS SPROGIS
BY
ATTORNEY

United States Patent Office 3,549,983
Patented Dec. 22, 1970

3,549,983
HIGH EFFICIENCY HIGH POWER D.C. SERIES TYPE VOLTAGE REGULATOR
Gunars Sprogis, Cleveland, Ohio, assignor to Union Carbide Corporation, a corporation of New York
Filed June 18, 1968, Ser. No. 737,994
Int. Cl. G05f 1/56
U.S. Cl. 323—15
2 Claims

ABSTRACT OF THE DISCLOSURE

A series type solid state power regulator for a multi-cell primary source of power wherein the driver stage is connected to an auxiliary source of energizing potential formed from at least one of the primary power cells.

This invention relates to electronic power regulation and more particularly to a D.C. solid state series type power regulator.

A regulator provides a constant output to variable loads from a given source of power. In instances where the power source is relatively expensive such as when represented by a stack of fuel cells or solar cells and where space and weight are at a premium, it is essential that the regulator consume as little power from the power source as possible, i.e. that the regulator have a high operating efficiency. To achieve low power losses at high currents in solid state series regulators requires as a basic design consideration low emitter to collector junction voltage across the series control element. To accomplish this requires a considerable base overdrive. Heretofore, low saturation voltage was obtained at the expense of overall regulator efficiency.

It is therefore the principal object of the present invention to provide a D.C. solid state series type power regulator of extremely high efficiency.

Figure 1:
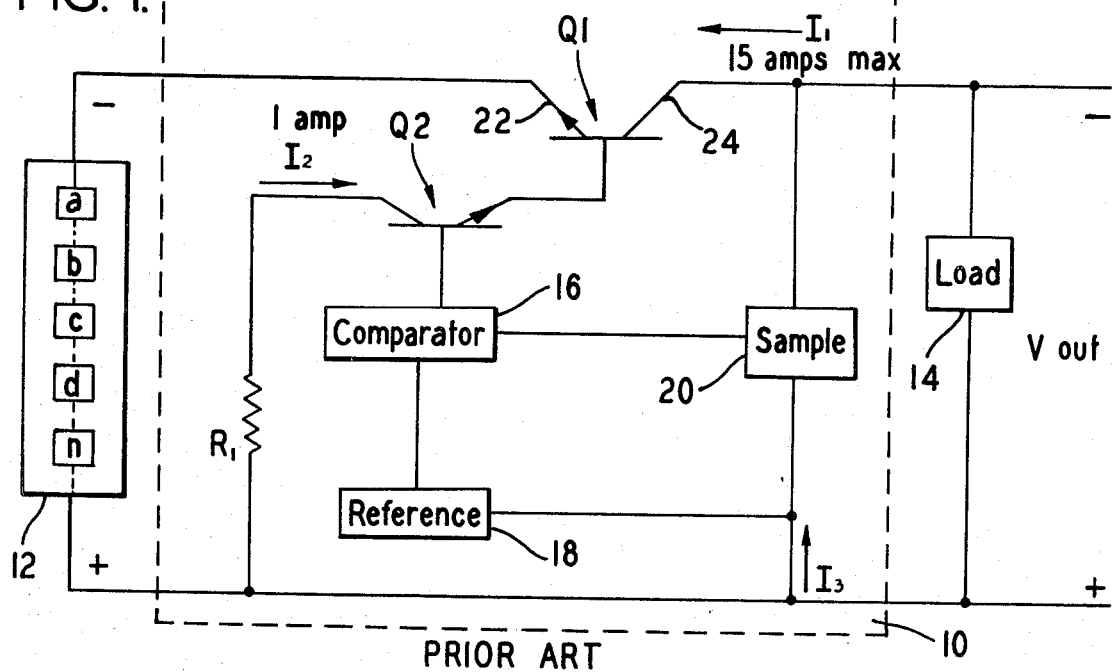
FIG. 1 is a typical series regulator design of the prior art with some circuitry shown schematically and the remainder shown in block form.

Referring to FIG. 1, a conventional series type solid state regulator 10 is shown electrically connected between D.C. power source 12 and load 14. D.C. power source 12 is of the general type in which a plurality of voltage producing elements or cells $a, b, c, d \ldots n$ are coupled in series to produce the desired primary source of power. The voltage producing elements may represent a multi-cell battery or a plurality of fuel cells, thermionic cells, solar cells, etc. It is to be noted that an electric battery by definition consists of two or more connected cells that convert chemical energy into electrical energy. The cell is the unit part of the battery. The electrical equivalent circuit of a cell is made up of an internal EMF in series with an internal resistance. Regulation is required due to the cumulative voltage drop across the internal resistance of each cell as the current density is increased.

The conventional power regulator 10 consists of a series control element $Q_1$, a driver element $Q_2$, a comparator circuit 16, a reference source 18 and a sample element 20. Regulation is performed by comparing a sample of the output voltage ($V_{out}$) with the voltage produced by the reference source 18; any error present is fed to the driver element $Q_2$ in proper phase relationship to control the current supplied by the series control element $Q_1$. The driver element $Q_2$ is typically a single transistor amplifier as is shown in FIG. 1. Under certain circumstances, generally for increased sensitivity, a plurality of amplifiers arranged in tandem are employed. The series control element $Q_1$ is a power transistor or other solid state device such as a tetrode. Control element $Q_1$ is chosen to meet the initial voltage and current requirements for the output. For illustrative purposes 15 amperes has been chosen as the desired maximum output current. The voltage drop across the emitter 22 to collector 24 multiplied by the maximum current $I_1$ determines the maximum power dissipated by control element $Q_1$. To maintain a minimum saturation voltage and yet provide a high output current such as 15 amperes requires a considerable base drive. The required magnitude of the base drive current depends upon the current gain of the series control element $Q_1$. If the current gain $h_{fe}$ of control element $Q_1$ is 15, a base drive of one ampere will be necessary. As a practical matter most power transistors acceptable for regulator operation have relatively low current gains. If we assume a voltage across the primary cell stack or input power source 12 of 28 volts and a required maximum base drive current of one ampere then in the conventional circuit of FIG. 1 it will be necessary for the dropping resistor $R_1$ to have a value of approximately 27 ohms for proper operation. Otherwise the driver transistor $Q_2$ will not be able to draw sufficient current to control the power transistor $Q_1$. On the other hand, if $R_1$ were reduced to zero an excessive amount of current would be drawn destroying the regulator function and in all probability damaging the driver transistor $Q_2$. For the conditions chosen $R_1$ would develop an $I^2R$ power loss of nearly 10% of the desired power output rendering the regulator quite inefficient.

Figure 2:
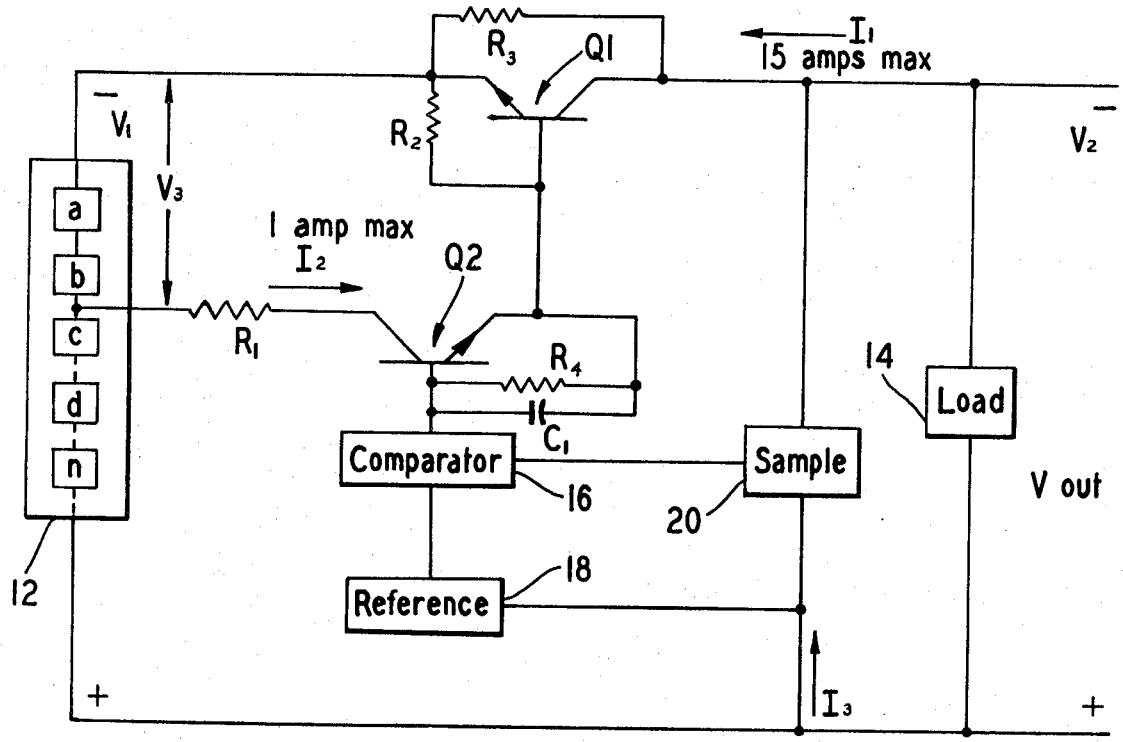
FIG. 2 illustrates the improved series regulator design according to the present invention.

It has been discovered that the efficiency of the regulator can be improved dramatically by using less than all of the input cells as a secondary or auxiliary voltage supply for developing the necessary base drive. Such an arrangement is illustrated in FIG. 2 showing the improved series regulator design of this invention. Although this results in a total current increase through only a portion of the entire cell stack, regulation is not affected noticeably. The operation of the circuit of FIG. 2 is equivalent to that of FIG. 1 with regulation accomplished in the same manner. Comparator 16, reference voltage source 18 and sampling element 20 (usually a voltage divider) are conventional circuits. The component values of the individual circuits are not critical for practicing the present invention. In order therefore to keep the specification clear and succinct, and not to obscure the invention, the circuits are shown in block form. The difference between the regulator of FIG. 1 and that of FIG. 2 resides in the use of only part of the entire cell stack of input power source 12 as an auxiliary source of power for the driver transistor $Q_2$. Assuming the same conditions of operation for the control and driver elements $Q_1$ and $Q_2$, the resistance value of $R_1$ will be determined by the voltage tapped off the primary cell stack of input power source 12. Hence, a three volt tap for example, depending upon the choice of $Q_2$, can yield a maximum base drive current $I_2$ of one ampere with $R_1$ reduced to zero ohms. As a practical matter $R_1$ would be retained as a current limiting device at some very low value. The $I^2R$ loss across this resistor would be negligible. Resistors $R_2$, $R_3$ and $R_4$ and capacitor $C_1$ are unnecessary for practicing the invention. They have been added to provide a more complete showing of the regulator as actually constructed. $R_2$ is used to tailer the characteristics of $Q_1$ for very low saturation voltages. $R_4$ tailors the characteristics of $Q_2$ performing the same function as $R_2$ with respect to $Q_1$. $R_3$ serves no useful function while the voltage regulator is in normal operation; its sole purpose is to turn on the voltage regulator when the input voltage is first applied. Without resistor $R_3$, transistor $Q_1$ may not conduct enough current initially to supply the current $I_3$ required to energize the comparator 16, reference source 18, and sample circuit 20. Under such conditions the driver stage $Q_2$ may fail to supply base current to $Q_1$, with the result that $Q_1$ may never turn on unless momentarily shorted from emitter to collector, or else shunted with a resistor such as $R_3$. Additionally, the capacitor $C_1$ is incorporated to by-pass electrical noise around $Q_2$ which may otherwise result in an amplified noise signal appearing on the output of $Q_1$.

The conventional regulator shown in FIG. 1 as well as the improved regulator of FIG. 2 have been shown and described with reference to a positive ground supply. It is obvious that the invention is equally applicable to a negative ground supply.

Set forth below is an example of the exceptional efficiency obtained from the circuit of FIG. 2 incorporated in a 300 watt, 28 volt hydrazine air fuel cell power supply with the following components and specification;

COMPONENT SELECTION $Q_1$ 2N3597 transistor
$Q_2$ 2N2697 transistor
$R_2$ 100 ohm resistor
$R_1$ .7 ohm resistor
$R_3$ 200 ohm resistor Voltage source 12 is a hydrazine-air fuel cell stack of 38 cells. Location of voltage tap for driver stage: 4 cells from negative end.

Circuit valves, amps $I_1 = 12.6$ _____ Voltage across cell stack $(V_1) = 29.03$ volts.
$I_2 = .9$ _____ Voltage across 4 cell tap $(V_3) = 2.4$ volts.
$I_3 = .04$ _____ Voltage output $(V_{out})$ across load = 28.5 volts.

Net power delivered to external Load = 28.5 v. × 12.6 amps = 359.10 watts.

Gross power generated by fuel cell stack:

| | Watts |
|---|---|
| Primary power to regulator: 29.03 v. × 12.6 amps | 365.78 |
| Power to drive $Q_2$: 2.4 v. × .9 amp | 2.16 |
| Power loss in comparator, reference, sampling: 28.5 v. × .04 amp | 1.14 |
| Gross power | 369.08 |

$$\text{Efficiency} = \frac{\text{Net power out}}{\text{Gross power}} = \frac{359.10}{369.08} = 97.3\%$$

What is claimed is:

1. In a high efficiency high power D.C. voltage regulator comprising: control means connected in series relationship with a single source of energizing potential and a load, said single source of energizing potential consisting of a plurality of individual cells serially connected to each other; a sampling element responsive to voltage variations across said load; a fixed reference voltage source; comparator means for providing an output error signal proportional to the difference in voltage between the output of said sampling element and said reference voltage; and means for driving said control means in response to said error signal, the improvement of which comprises, said means being connected between individual cells of said source of energizing potential.

2. A high efficiency D.C. power regulator according to claim 1 wherein said means for driving said control means is a transistor having a collector, emitter and base, said collector being connected between said individual cells of said source of energizing potential for drawing current therefrom to drive said control means.

References Cited

UNITED STATES PATENTS 3,056,915  10/1962  Meewezen _____ 323—22(T)
3,383,585  5/1968  Gately _____ 323—22X(T)

J D MILLER, Primary Examiner

A. D. PELLINEN, Assistant Examiner

U.S. Cl. X.R.

323—22, 38